(12) United States Patent
Romanelli et al.

(10) Patent No.: US 8,375,581 B2
(45) Date of Patent: Feb. 19, 2013

(54) SUPPORT STRUCTURE FOR LINEAR FRICTION WELDING

(75) Inventors: James Romanelli, Colchester, CT (US); Wangen Lin, South Glastonbury, CT (US); Robert P. Delisle, Colchester, CT (US); Herbert A. Chin, Portland, CT (US); James J. Moor, New Hartford, CT (US); Jesse R. Boyer, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 268 days.

(21) Appl. No.: 13/026,754

(22) Filed: Feb. 14, 2011

(65) Prior Publication Data

US 2012/0205348 A1 Aug. 16, 2012

(51) Int. Cl.
*B23K 20/12* (2006.01)
*B23K 37/04* (2006.01)
*B32B 15/02* (2006.01)
*B29C 67/04* (2006.01)

(52) U.S. Cl. ....... 29/889; 228/112.1; 228/114; 228/176; 269/55; 269/86; 269/909; 416/213 R; 148/524; 148/525; 419/66; 29/402.13

(58) Field of Classification Search ............... 29/889, 29/889.1, 402.09, 402.13, 402.16; 228/112.1, 228/114, 119, 176; 269/37, 41, 55, 86, 909; 148/524, 525; 416/193 A, 213 R, 219 R; 419/66; 219/121.63, 121.64
See application file for complete search history.

(56) References Cited

U.S. PATENT DOCUMENTS

| 4,863,538 | A | 9/1989 | Deckard |
| 5,865,364 | A | 2/1999 | Trask et al. |
| 6,042,774 | A | 3/2000 | Wilkening et al. |
| 6,524,072 | B1 * | 2/2003 | Brownell et al. ......... 416/213 R |
| 6,616,408 | B1 * | 9/2003 | Meier ...................... 416/193 A |
| 7,454,262 | B2 | 11/2008 | Larsson |
| 8,046,097 | B2 * | 10/2011 | Hull et al. ..................... 700/119 |
| 8,153,183 | B2 * | 4/2012 | Skubic et al. ..................... 427/8 |
| 2009/0314823 | A1 | 12/2009 | Bray |

OTHER PUBLICATIONS

Miani, F. "Recent developments of direct metal selective laser sintering" University of Udine. Udine, Italy. Prior to Jan. 1, 2011. <www.ics.trieste.it/media/133856/df143.pdf>.

* cited by examiner

*Primary Examiner* — Samuel M Heinrich
(74) *Attorney, Agent, or Firm* — Kinney & Lange, P.A.

(57) ABSTRACT

A method and apparatus for fixturing an airfoil stub during linear friction welding are described. Critical clamping support structures are manufactured by a direct digital manufacturing process such as direct metal laser sintering to minimize time and expense of the process.

23 Claims, 3 Drawing Sheets

SUPPORT STRUCTURE FOR LINEAR FRICTION WELDING

STATEMENT OF GOVERNMENT INTEREST

This invention was made with government support under contract #F33657-03-D-0016-0010 awarded by the United States Air Force. The government has certain rights to the invention.

BACKGROUND

As known in the art, structures may be bonded together by means of linear friction welding. In such a process, a surface on one of the structures is contacted (interfaced) to a surface on the other structure. The interfacing surfaces typically have complementary features, i.e. similar lengths and similar widths. The two parts are rubbed together, in a back and forth, in a linear type oscillatory manner. The axis of the oscillation is typically roughly aligned with the longitudinal (lengthwise) axis of the interface, i.e. end to end. As the parts are rubbed, compressive force is applied to place the interface under high pressure. At the interface, frictional heat is generated and material from each part changes to a solid plastic state. Some of this material flows out from between the parts (flash flow), resulting in gradual decrease in the thickness, i.e. the dimension in the direction in which pressure is applied (the dimension perpendicular to the interface) to the part. When the process is terminated, flash flow ceases, and at the interface, the remaining plastic state material cools and forms a solid state bond of the two parts.

However, a problem exists with this process in that the bond is usually incomplete, i.e. defective, at the ends of the interface. The nature of the defect is lack of bonding in the shape of a notch. It occurs in part because the ends of the interface, roughly on the axis of oscillation, are alternatingly exposed to ambient during each oscillation cycle. While exposed, the end is not rubbed and therefore not frictionally heated. Thus, as a result of the alternating exposure, the ends are only alternatingly heated and the temperature of the ends does not get high enough to produce complete bonding.

Efforts have focused on developing processes which ensure that the defect does not form within the outline of the final shape of the product. In the fabrication of original equipment, part geometries can be oversized so that the defects that form are located outside the outline of the final product. The defects are then removed as the product is machined down to its final shape. However, in repair situations, a damaged portion is removed, but the remaining portion is already at its final shape and dimension, and therefore, an oversized geometry is not a viable alternative.

One of the numerous applications for linear friction welding is that of attaching blades (airfoils) to a rotor and thereby forming an integrally bladed rotor (IBR). In such an application, a base surface on the airfoil is interfaced to a slightly elevated surface on the rotor. However, without preventative measures, the bond risks being defective at the airfoil edges, because the airfoil edges are situated at the ends of the interface, roughly on the oscillation axis. As a result, the airfoil edges are alternatingly exposed to ambient and only alternatingly heated during oscillation and the edge temperature does not get high enough to produce complete, adequate bonding. Although the defect may not constitute a crack per se, it could initiate a crack during engine operation, and thus its presence in an IBR is unacceptable.

In the prior art approach for preventing defects at the edges for IBR repairs, the damaged portion of an airfoil under repair is removed, e.g. by removing a longitudinal section, and flanges or collars are provided around the edges of the remaining portion. The flanges or collars are supported by a pair of jaws gripping the undamaged remaining airfoil section (or stub). The collars have a shape closely matching the shape of the undamaged airfoil stub. Similar flanges and jaws are provided to grip a replacement airfoil portion. The collars around each portion prevent the airfoil edges of the other portion from being alternatingly exposed to ambient and sufficient heat is generated to achieve bonding. Any defects formed reside in the collar regions and are machined away after joining. With this prior art approach, the (relatively) massive jaws holding the collars and airfoils can cause damage to both the remaining stub and replacement airfoil due to inaccuracies in shape mismatch between the collars and blades and due to the relatively soft nature of titanium alloys, prime candidates for this application.

These and other issues were solved by the process taught in commonly owned U.S. Pat. No. 5,865,364 to Trask et al. and hereby incorporated herein in its entirety. Improvements to the processes taught in the above-mentioned patent are the subject of this invention.

SUMMARY

The dimensional tolerances of fixtures supporting an airfoil stub during linear friction welding of a new airfoil section to the airfoil stub are critical for successful joining. The clamping fixtures are expensive and time consuming to fabricate. Replacing the existing fixtures with parts produced by a direct digital manufacturing method results in considerable savings in both time and expense.

DETAILED DESCRIPTION OF THE PREFERRED EMBODIMENTS

Figure 1:
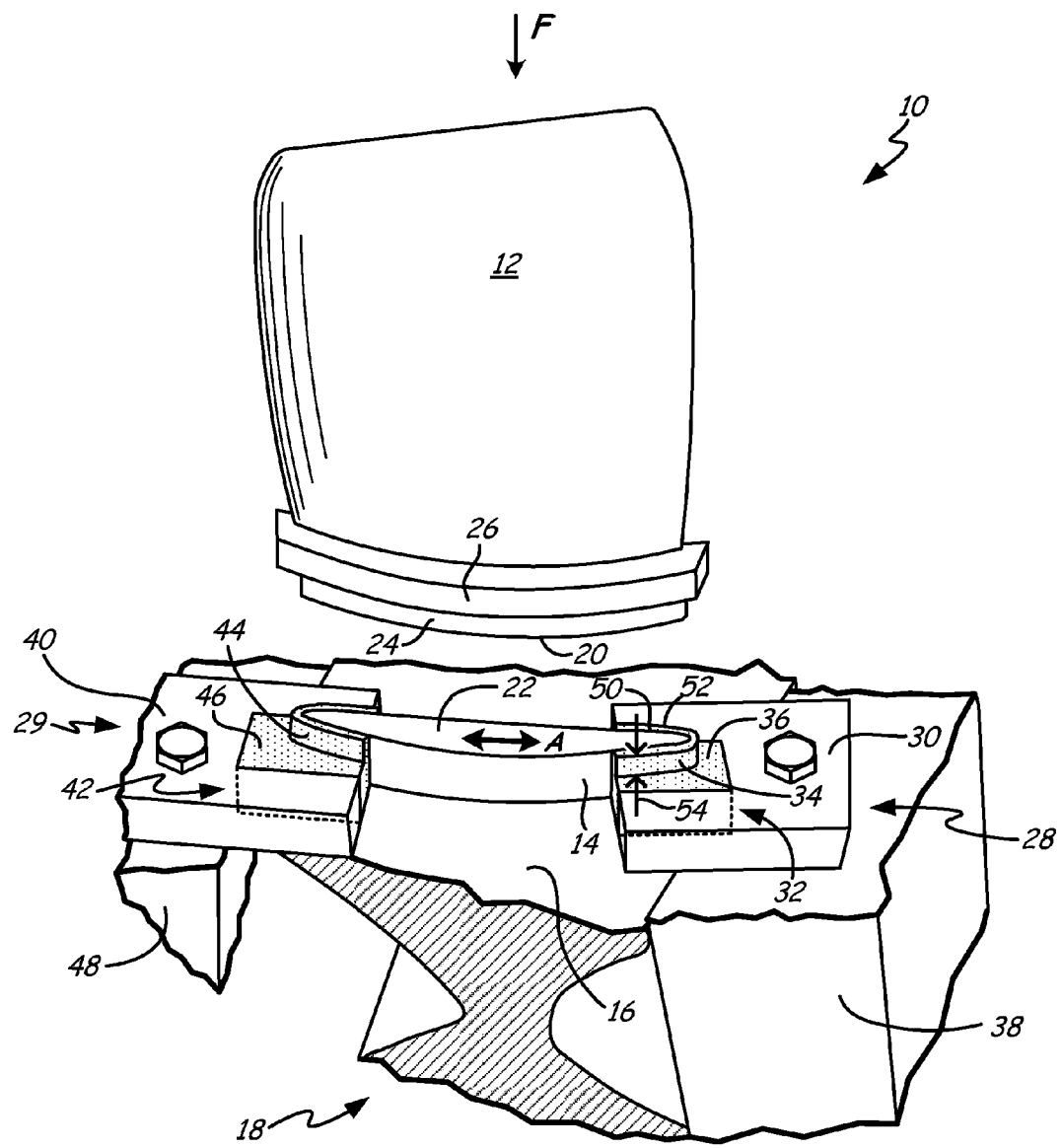
FIG. 1 is a partial perspective view of an integrally bladed fan rotor with an airfoil stub clamping fixture to be linearly friction welded to a replacement airfoil.

FIG. 1 is a perspective view of the components and fixtures employed in linear friction welding assembly 10 of the present invention, which features the use of direct digital manufactured support structure. In the embodiment, replacement airfoil 12 is positioned to be joined to airfoil stub 14 on rotor surface 16 of rotor 18 by linear friction welding (LFW). In the linear friction welding process, longitudinal surface 20 of replacement airfoil 12 may be joined to longitudinal surface 22 of airfoil stub 14. Airfoil stub 14 may be clamped in a static position while replacement airfoil 12 may be oscillated along longitudinal axis A under normal force F during linear friction welding.

In the fixture shown in FIG. 1, airfoil stub 14 is clamped at its leading and trailing edges by leading edge clamping fixture 28 and trailing edge clamping fixture 29. Leading edge clamping fixture 28 comprises vise 30 and direct digital manufactured support structure insert 32. Clamping insert 32 comprises leading edge collar 34 and base 36 (partially shown by phantom lines). Leading edge clamping fixture 28 is preferably held in place by associated tooling 38.

Trailing edge clamping fixture 29 comprises vise 40 and direct digital manufactured metal alloy clamping insert 42. Clamping insert 42 comprises trailing edge collar 44 and base 46 (partially shown by phantom lines). Trailing edge clamping fixture 29 is preferably held in place by associated tooling 48.

During joining, flange 26 on replacement airfoil 12 is clamped in an oscillating fixture (not shown) and oscillated along longitudinal axis A while force F is applied in a downward direction perpendicular to longitudinal axis A. Frictional heating causes mating surfaces 20 and 22 to become plastic and allows force F to move airfoil stub 14 and replacement airfoil 12 closer together, resulting in portions of airfoil section 24, collars 34 and 44 and a portion of the top of airfoil stub 14 being ejected as flash (not shown) as force F moves the two parts closer together during the welding process. As oscillation stops, the joint rapidly cools and a weld is formed.

Any defects formed due to the alternate exposure of the weld components to ambient during linear friction welding reside in collars 34 and 44 and are removed by machining.

Clamping fixtures 28 and 29 provide collars 34 and 44 to be in intimate contact with airfoil stub 14 as receptacles for airfoil stub 14 at the leading and trailing edges during linear friction welding. Collars 34 and 44 are preferably of an alloy with a composition similar to or preferably identical to the alloy of airfoil stub 14 such that the resulting weld has a homogeneous alloy composition. As stated above, the purpose of collars 34 and 44 is to move the interface between ambient atmosphere and airfoil stub 14 away from the lateral surfaces of airfoil stub 14 such that defects formed during linear friction welding due to alternating exposure of the weld to ambient reside in the collars instead of airfoil 14 itself. Following linear friction welding, the defects and the resulting flash (not shown) are machined away.

Clamping fixture 28 will now be described as an exemplary embodiment. Clamping fixture 28 comprises vise 30 and direct digital manufactured insert 32. Clamping insert 32 comprises collar 34 and base 36. Collar 34 is preferably of the same alloy composition or a similar composition to airfoil stub 14. Collar 34 comprises inner surface 50, outer surface 52, and height 54. The dimensions of collar 34 are known to those in the art and are described in Trask et al. Inner surface 50 is preferably shaped to maintain close and uniform contact with the exterior surface of airfoil stub 14 to provide a clamping receptacle to minimize relative movement between airfoil stub 14 and collar 34 during LFW. The thickness of collar 34 is preferably small enough such that the load experienced by the collars is small enough to allow efficient heating during linear friction welding while maintaining sufficient mechanical support to airfoil stub 14.

Figure 2:
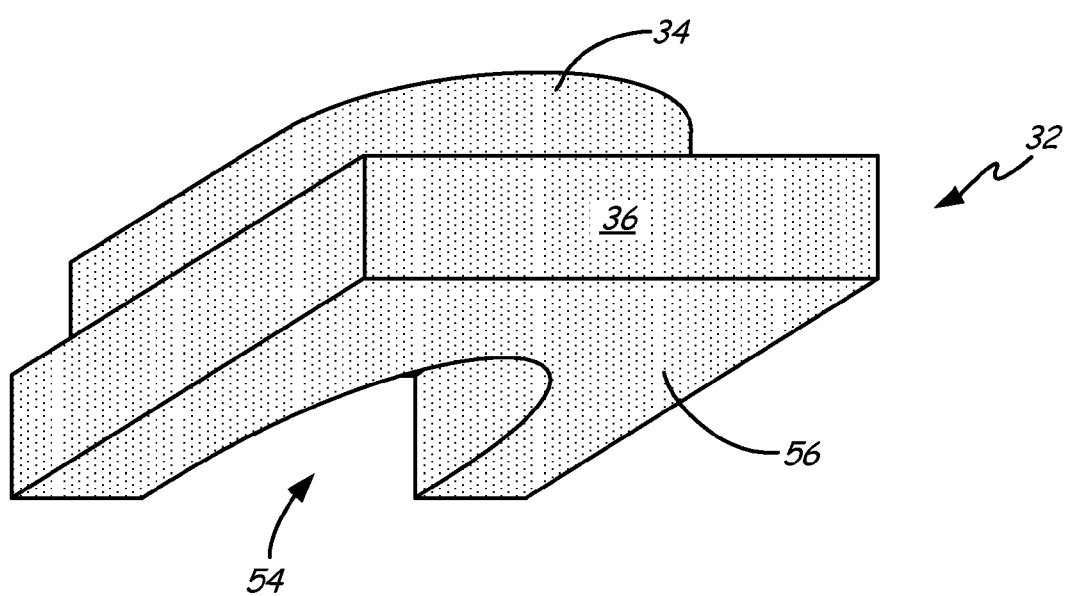
FIG. 2 is a schematic perspective view of a leading edge clamping fixture showing collar and base.

Base 36 of clamping insert 32 has a substantially rectilinear geometry as shown in FIG. 1. Base 36 can be of the same alloy as collar 34 or a higher strength alloy than collar 34 to withstand clamping forces from vise 30. Collar 34 contacts airfoil stub 14 during linear friction welding but base 36 does not. A schematic perspective view of clamping insert 32 is shown in FIG. 2. Base 36 has v-shaped slot 54 for receiving the leading edge region of airfoil stub 14. Bottom surface 56 of base 36 is preferably shaped to conform to surface 16 of rotor hub 18 and to allow for clearances with respect to surface 16 to permit fixturing access to rotor hub 18. Thus, the shape of clamping insert 32 may be irregular and difficult to fabricate by machining techniques, but is achievable by direct digital manufacturing techniques as described below.

Clamping insert 42 may be materially and geometrically similar to clamping insert 32.

For successfully joining replacement airfoil 12 to airfoil stub 14, it is imperative that stub 14 remain stationary during linear friction welding. Airfoil stub 14 is clamped at the leading and trailing edges by collars 34 and 44. Collars 34 and 44 are the only external members in contact with airfoil stub 14 during joining. It is critical that the interior contours of collars 34 and 44 match the external contours of the leading and trailing edge regions of airfoil stub 14 to ensure rigid clamping. Any mismatch in the contact surfaces can result in relative motion between collars 34 and 44 and airfoil stub 14 during linear friction welding. This can result in inadequate support or damage to the airfoil stub leading to potential defects in the weld interface. As such, the success of the linear friction welding process discussed herein, depends on the shape of clamping inserts 32 and 42, most particularly on the inner surface contours of collars 34 and 44 being closely matched to the exterior surface contour of airfoil stub 14.

In the prior art, clamping inserts were produced by time consuming and expensive precision machining processes. In one process, the collars and bases were machined using a conventional milling process. In another process, the clamping inserts were integrally fabricated in one piece in a two step operation. A rough version of the clamping inserts was first produced by such means as wire electrode discharge machining (wire EDM). In this process, a tool (e.g. a wire) and a work piece are at different electrical potentials, and are submerged in a high dielectric constant fluid. When the tool is in close proximity to the work piece, a resulting spark discharge occurs which removes a minute amount of material. The motion of the tool was computer controlled according to a CAD model of the required parts stored in memory. In the second phase of the operation, the EDM machined part was then precisely machined to a final shape by milling and other precision machining processes. Both prior art fabrication processes for clamping inserts were time consuming and expensive.

Figure 3:
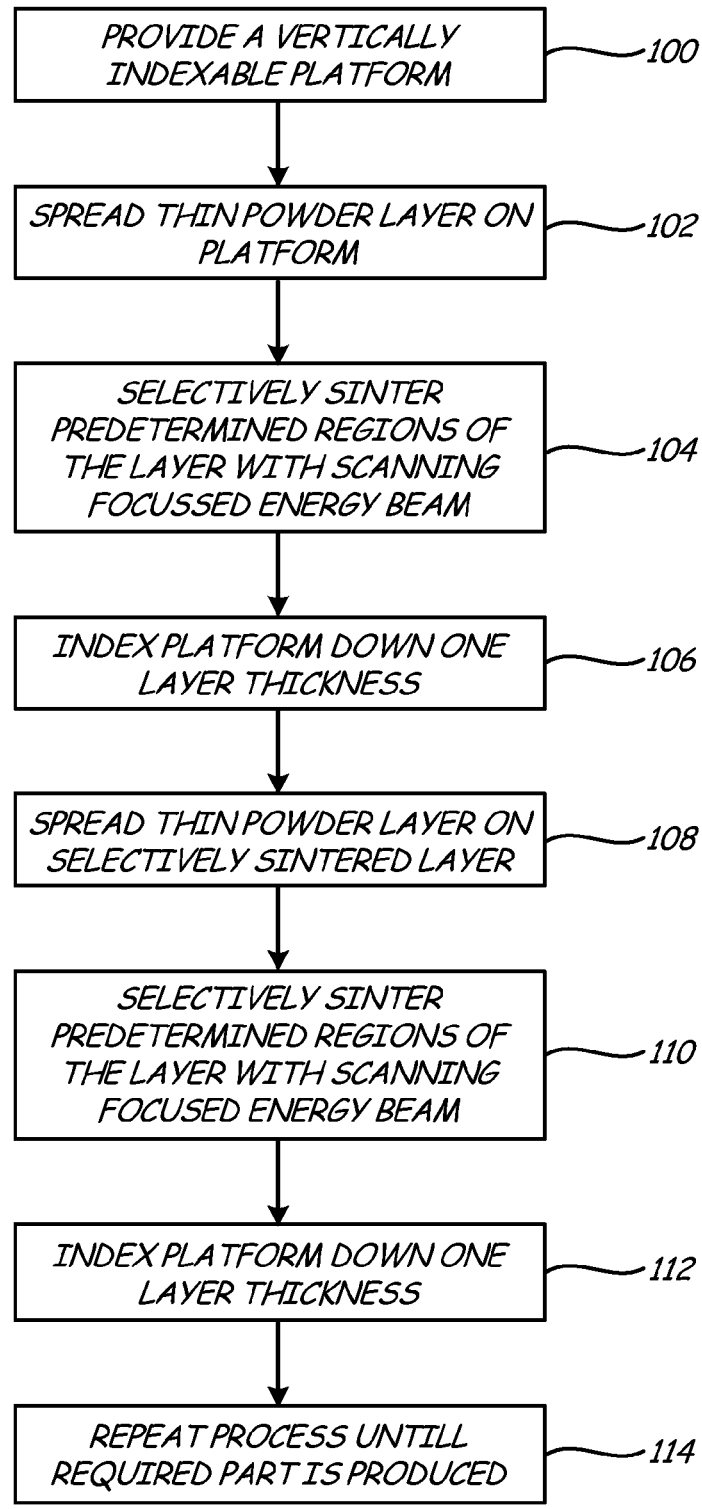
FIG. 3 is a diagram of a direct digital manufacturing process.

The present invention replaces the expensive prior art machining processes with a rapid, economical, and reproducible direct digital manufacturing process. Cost savings of over 60% can be realized. A preferred embodiment of the process is outlined in FIG. 3. Using direct digital manufacturing, a part is manufactured layer by layer on a platform (Step 100) in a chamber with a controlled environment, preferably an inert atmosphere or vacuum. First, a thin layer of a powder of the material that will form the desired part (clamping insert) is spread on the platform (Step 102). One or more focused energy beams are then scanned across the platform to manufacture preselected areas of the powder (Step 104). The manufactured areas on the platform represent a single cross sectional slice of the desired part. The energy beams are directed according to a CAD model of the part inserted in the memory of computerized scanning hardware. Following the first scan, the platform is indexed downwardly by one layer thickness (Step 106) and another powder layer is spread on the manufactured layer (Step 108). This layer is then scanned by the energy beam(s) to selectively manufacture preselected areas of the second layer of the part (Step 110) after which the platform is indexed downwardly again (Step 112). The process is repeated layer-by-layer until the clamping insert is produced (Step 114). The dimensional accuracy of clamping inserts produced by this type of direct digital manufacturing scales as the beam diameter, servo-control accuracy of the scan and the powder size. Surface roughness is a function of particle size. Smaller particles produce smoother surfaces. Overall, dimensional tolerances of better than ±0.5 mils are known in the art.

In the preferred embodiment, direct digital manufacturing is by, but not restricted to, selective laser sintering, electron beam sintering, and direct metal laser sintering. Selected laser sintering is taught in U.S. Pat. No. 4,863,538 to Deckard and is incorporated herein in its entirety by reference. Electron beam sintering is taught in U.S. Pat. No. 7,454,262 to Larsson and is incorporated herein in its entirety by reference. Direct metal laser sintering is taught in U.S. Pat. No. 6,042,774 to Wilkening et al. and is incorporated herein in its entirety by reference. The Deckard and Wilkening et al. processes use scanning lasers as energy sources. A preferable embodiment for the instant invention is direct metal laser sintering.

It was noted that collars 34 and 44 of the clamping inserts 32 and 42 were preferably the same or similar alloys as airfoil stub 14 and that bases 36 and 46 of clamping inserts 32 and 42 could be different, preferably higher strength, alloys. As seen from the above discussion, a single part produced by direct digital manufacturing technologies discussed herein can have subcomponents with different alloy compositions by changing powder compositions during manufacturing.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of attaching an airfoil to an airfoil stub of an integrally bladed rotor, the method comprising:
    forming first and second alloy clamping support structures produced by a direct digital manufacturing process;
    positioning the first clamping support structure in contact with a leading edge region of the airfoil stub;
    positioning the second clamping support structure in contact with a trailing edge region of the airfoil stub;
    applying clamping force to the first and second clamping support structures;
    contacting the airfoil stub with the airfoil; and
    oscillating the airfoil with respect to the airfoil stub to frictionally weld the airfoil to the stub.

2. The method of claim 1, wherein the first clamping support structure includes a first base and a first collar and wherein the second clamping support structure includes a second base and a second collar.

3. The method of claim 2, wherein the first collar has a receptacle with an inner surface contour about identical to an outer surface contour of the leading edge region of the airfoil stub and the second collar has a receptacle with an inner surface contour about identical to an outer surface contour of the trailing edge region of the airfoil stub.

4. The method of claim 3, wherein the first and second collars comprise a metal alloy substantially identical to a metal alloy that forms the airfoil stub.

5. The method of claim 4, wherein the first and second bases are formed of a metal alloy the same as or different from the metal alloy of the first and second collars.

6. The method of claim 3, wherein the first and second bases do not contact the airfoil stub.

7. The method of claim 1, wherein the first and second clamping support structures are produced by direct digital manufacturing technology from metal alloy powder.

8. The method of claim 7, wherein the direct digital manufacturing technology comprises at least one of direct metal laser sintering, electron beam sintering, and selected laser sintering.

9. The method of claim 8, wherein the direct digital manufacturing technology comprises direct metal laser sintering.

10. An apparatus for clamping a stationary part with a longitudinal planar surface during linear friction welding to a movable part with a longitudinal planar surface such that a weld is formed between the longitudinal surfaces, the apparatus comprising:
    a first vise member;
    a first clamping support structure produced by a direct digital manufacturing process mounted in the first vise member for receiving a first portion of the stationary part;
    a second vise member; and
    a second clamping support structure produced by a direct digital manufacturing process mounted in the second vise member for receiving a second portion of the stationary part.

11. The apparatus of claim 10, wherein the first clamping support structure includes a first base and a first collar, and the second clamping support structure includes a second base and a second collar.

12. The apparatus of claim 11, wherein the first collar comprises an inner surface contour that is about identical to an outer surface contour of the first portion of the stationary part, and the second collar comprises an inner surface contour that is about identical to an outer surface contour of the second portion of the stationary part.

13. The apparatus of claim 12, wherein the stationary part comprises a stub section of an integrally bladed airfoil and the first and second portions are leading edge and trailing edge regions, respectively.

14. The apparatus of claim 13, wherein the first and second collars are in contact with the airfoil stub during clamping and the first and second bases are not.

15. The apparatus of claim 11, wherein the first and second collars are formed of metal alloys selected from the group consisting of titanium alloys, nickel alloys, iron alloys, and combinations thereof.

16. The apparatus of claim 15, wherein the first and second collars are formed of similar or identical metal alloys to the stationary part.

17. The apparatus of claim 16, wherein the first and second bases are formed of same or different alloys than the first and second collars.

18. A clamping support structure having a collar and a base configured for mounting to one of a leading edge or a trailing edge of an integrally bladed airfoil stub during linear friction welding, wherein the collar and the base are produced by a direct digital manufacturing process.

19. The clamping support structure of claim 18, wherein the collar has a receptacle with an inner surface contour about identical to an outer surface contour of the airfoil stub.

20. The clamping support structure of claim 19, wherein the collar comprises a metal alloy substantially identical to a metal alloy that forms the airfoil stub.

21. The clamping support structure of claim 18, wherein the collar is configured to be in contact with the airfoil stub and the base is not.

22. The clamping support structure of claim 18, wherein the collar and base are formed of same or different metal alloys.

23. The clamping support structure of claim 18, wherein the dimensional tolerances of the collar are better than ±0.5 mils.

* * * * *